July 3, 1923.
C. E. POTTER
1,460,604
BATTERY CONNECTOR
Filed Feb. 17, 1921 3 Sheets-Sheet 2
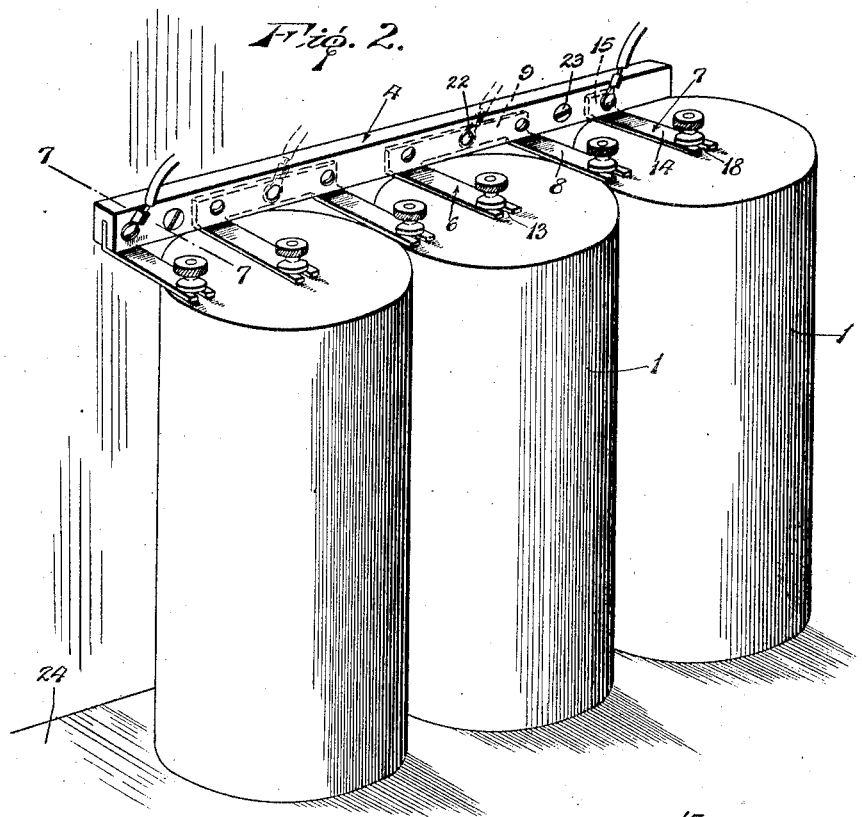
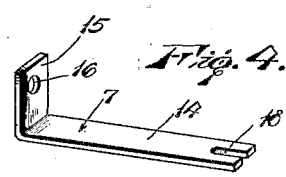
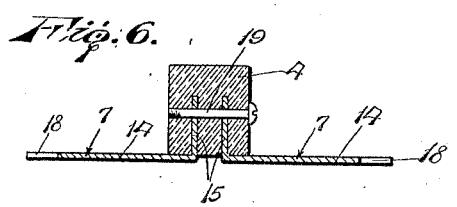
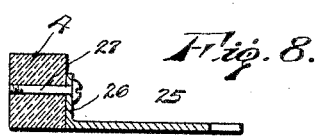
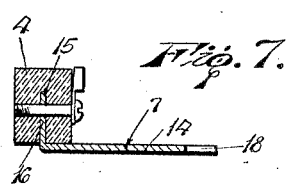
Inventor
C. E. Potter.
By
Lacey & Lacey, Attorneys

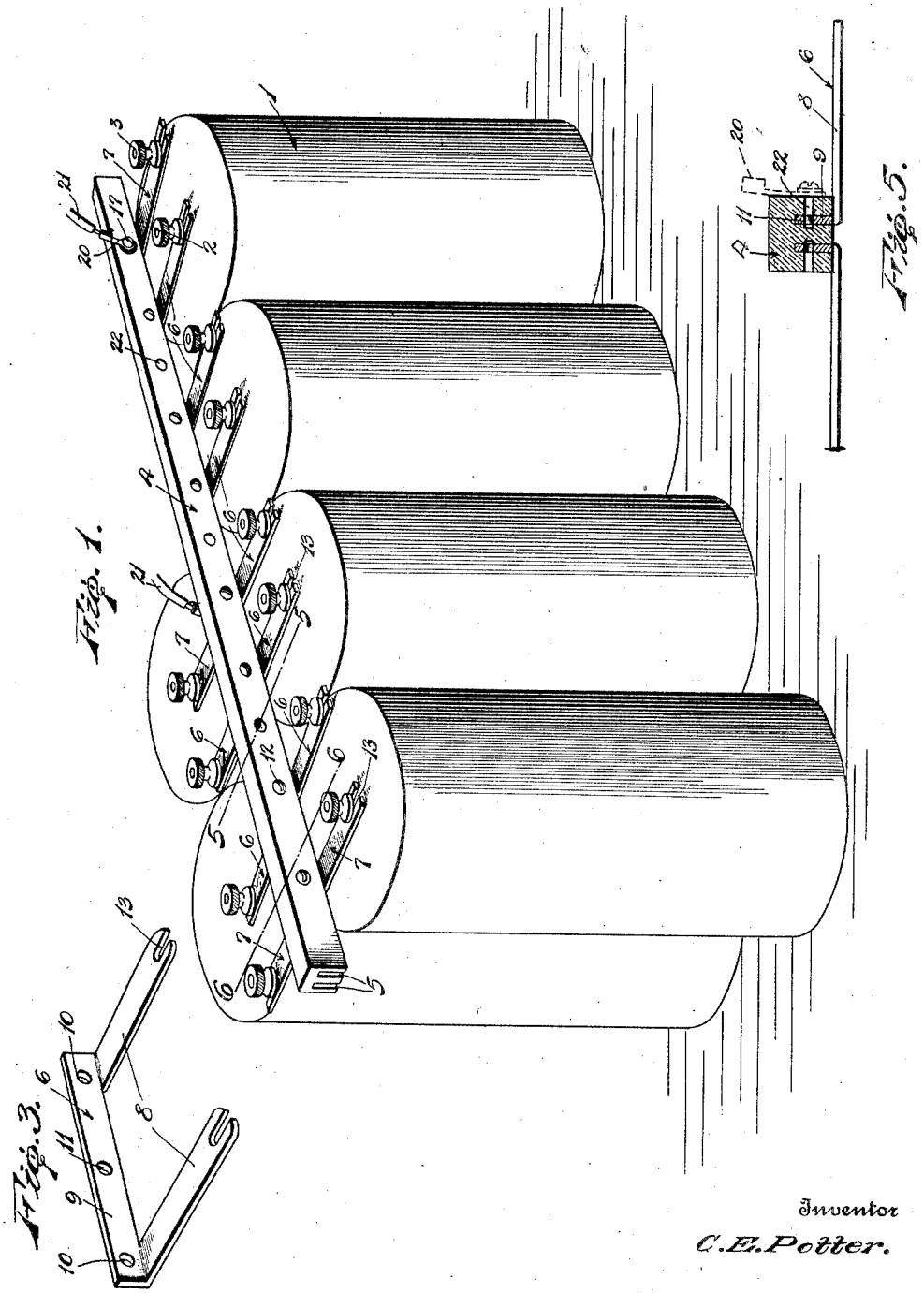

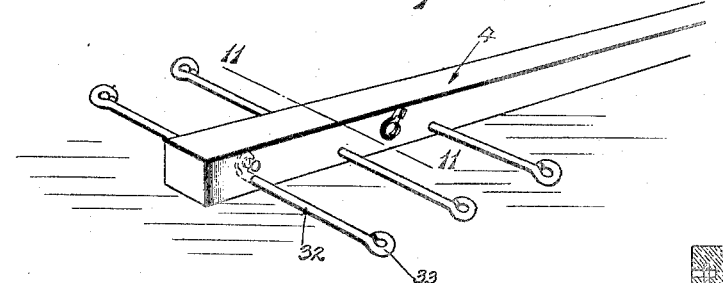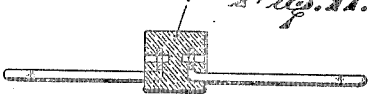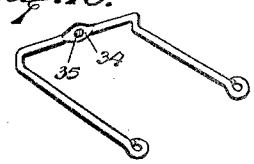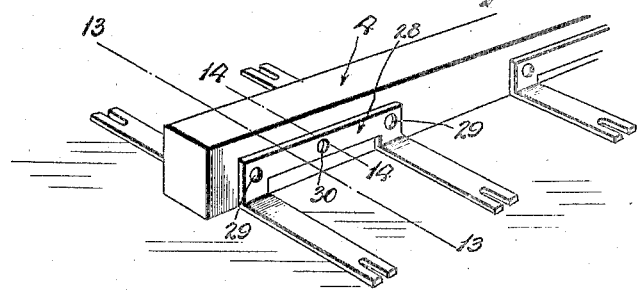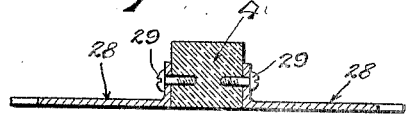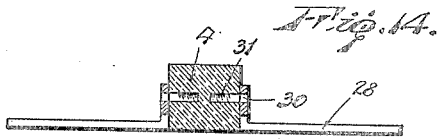

Patented July 3, 1923.

1,460,604

UNITED STATES PATENT OFFICE.

CLARENCE E. POTTER, OF BALTIMORE, MARYLAND.

BATTERY CONNECTOR.

Application filed February 17, 1921. Serial No. 445,652.

*To all whom it may concern:*

Be it known that I, CLARENCE E. POTTER, a citizen of the United States, residing at Baltimore, in the county of Baltimore City and State of Maryland, have invented certain new and useful Improvements in Battery Connectors, of which the following is a specification.

This invention relates to battery connectors and more especially to a connector which is designed for the purpose of connecting the terminals of a number of battery cells, the principles of the invention being applicable when the cells are to be connected in series, or multiple, or series-multiple. Where a battery comprising a number of dry cells for example is employed in a telephonic circuit, an automobile ignition circuit, or in fact under any condition where the conductor wires require to be connected in a precise manner and any other arrangement would be impracticable if not positively rendering the system inoperative, it not infrequently happens that inexperienced or careless electricians or others who are not familiar with the work will in renewing one or more of the battery cells fail to make the proper electrical connections, with the results stated. It is therefore one of the primary objects of the present invention to provide a connector which may be readily and accurately assembled with a required number of battery cells and to the terminals of which the conductor wires may be permanently connected so that this latter connection need not be disturbed in renewing any one or more of the cells.

Another object of the invention is to provide a battery connector of the class above mentioned so constructed as to adapt it to be readily and quickly assembled with the binding posts or terminals of standard cells without the necessity of employing any wires or similar electrical conductors liable to become disarranged or torn loose from the battery terminals.

Another object of the invention is to provide a battery connector so constructed that in assembling the same with a number of battery cells, the one performing the task will be influenced to establish the proper connections, even though he be inexperienced in the work, and so that liability of an improper or inoperative connection is reduced to a minimum.

In the installation and operation of electrical circuits of various kinds and where a number of dry cells for example constitute the source of current supply, it is frequently desirable to establish a plurality of circuits in connection with the battery and these circuits may operate on different voltages. For this purpose it is necessary to tap the battery circuit at points to embrace only the required number of cells to produce the desired voltage, and, by the ordinary method where conductor wires are employed solely, this task is confusing to an inexperienced person, and even skilled electricians are liable to make errors in establishing the connections. Therefore it is a further object of the present invention to provide a battery connector so constructed that the battery circuit may be readily and conveniently tapped to obtain current from any desired part of the total number of cells coupled by the connector, and thus any desired voltage readily obtained with certainty.

Another object of the invention is to so construct the connector that regardless of the number of electrical conductors leading therefrom for the supply of current, any one or more of the cells coupled by the cennector may be removed and replaced without disturbing the connection of the said electrical conductors with the connector.

The principles of the invention may find embodiment in a connector for employment in circuits where the connections are more or less complicated, and on the other hand the invention, in a simpler embodiment, is particularly useful where it is desired to couple a small number of cells as for example in a house bell circuit, buzzer circuit, or the like. Ordinarily in such a circuit the cells are placed upon the shelf or other support and no other connection is provided between them or any support afforded except the conductor wires which are connected with their binding posts. As a result the cells are liable to be knocked about and the connections torn loose. In one embodiment of my invention however, the connector is so constructed that it may be secured for example to a wall surface and the conductor wires of the bell or other circuit permanently connected with its terminals, the construction of the connector being such that when the required number of cells are assembled therewith, the cells will be rigidly held in place and prevented from relative movement such as results in severance of the connections established in the old way, although at the same time any one or more of the cells may be removed and replaced whenever required.

In the accompanying drawings:

Figure 1 is a perspective view of one form of connector embodying the invention assembled with a battery of dry cells of standard type;

Figure 2 is a similar view but illustrating a simpler arrangement;

Figure 3 is a perspective view of one of the conductor elements of the connectors shown in Figures 1 and 2;

Figure 4 is a similar view of another conductor element;

Figure 5 is a transverse sectional view on the line 5—5 of Figure 1;

Figure 6 is a similar view on the line 6—6 of Figure 1;

Figure 7 is a similar view on the line 7—7 of Figure 2;

Figure 8 is a view similar to Figure 7 illustrating a slight modification of the invention;

Figure 9 is a perspective view illustrating another embodiment of the invention;

Figure 10 is a perspective view of one of the conductor elements forming a part of the structure shown in Figure 9;

Figure 11 is a sectional view on the line 11—11 of Figure 9;

Figure 12 is a view similar to Figure 9 illustrating another embodiment of the invention;

Figure 13 is a transverse sectional view on the line 13—13 of Figure 12;

Figure 14 is a similar view on the line 14—14 of Figure 12.

In all forms of the invention illustrated in the drawings the principle is the same, and in fact the drawings are intended only to show several possible embodiments of the invention, it being understood that the relative arrangement of the parts comprising the conductor will be varied in accordance with the requirements in each particular case.

Referring more particularly to the embodiment of the invention illustrated in Figures 1 to 6 inclusive, although this embodiment possesses features common to the form shown in Figures 2 and 7 as will presently be explained, the numeral 1 indicates in general a plurality of dry cells of standard type each having positive and negative terminals 2 and 3 respectively which are in the form of the ordinary binding posts. In Figure 1, a suitable number of cells, for example six are to be coupled to constitute the battery, and the connector illustrated in Figure 6 is particularly designed for use in connection with this number of cells. The said connector includes an insulating body 4 which may be of any material found suitable for the purpose such for example as hard rubber, fibre, vulcanite, or the like, and the said body is in the nature of a strip of any desired cross-sectional shape and formed in what is its under side when the connector is in use, with spaced parallel longitudinally extending grooves 5. The body 5 may be of any required length and in fact it may be cut off from a long strip of the construction illustrated. In other words, in carrying out the invention, long strips of insulating material might be provided with grooves 5 and then suitable lengths cut from such a strip depending upon the number of cells to be coupled. In connection with the strip there are employed conductor elements some of which are of the double type shown in Figures 3 and 6, and others of the single type shown in Fig. 4, and these elements, in the present embodiment of the invention, are preferably formed from sheet metal. The conductor element shown in Figure 3 is indicated in general by the numeral 6, and the single conductor element shown in Figure 4 is indicated in general by the numeral 7. The conductor element 6 is formed from a sheet metal blank and comprises spaced conductor portions 8 which are connected and extend in spaced relation from the ends of a bridge piece 9 with the lower edge of which they are preferably formed integral. This bridge piece 9 has openings 10 formed through it near its ends and preferably an opening 11 formed at an intermediate point in its length. In the manufacture of the connector, the bridge piece 9 of the one or more conductor elements 6 employed, is fitted into one or the other of the grooves 5, and screws or other fastening elements 12 are fitted into the insulator body 4 and through the openings 10 so as to secure the said elements 6 in place. The conductor portions 8 of the element 6 therefore extend horizontally from the under side of the body 4, and they are preferably of a length at least equal to the radius of the upper end of the ordinary standard dry cell. Each of the portions 8 is formed in its outer end with an aperture or notch 13, and these notches are designed to receive the binding posts or terminals 2 or 3 as the case may be of adjacent cells. For example the notch in the end of one of the portions 8 will receive the positive terminal 2 of one cell, and the notch in the other portion 8 of the same conductor element will receive the negative binding post or terminal 3 of an adjacent cell. Upon application of the portion 8 to the binding posts of adjacent cells, the binding nuts upon these posts are tightened thus securely connecting the parts. The length of the portions 8 and the space between these portions is such that the cells to be coupled may be arranged side by side in compact relation and at one side of the vertical plane occupied by the body 4. Thus groups of cells may be aranged at opposite sides of the plane of the said body and coupled by conductor elements arranged in both grooves 5 and having their conductor portions 8 projecting beyond the corresponding sides of the said body 4.

The single conductor element shown in Figure 4 of the drawings and indicated by the numeral 7 may be formed from a strip of sheet metal and comprises a portion 14 similar in form and dimensions to the portion 8 of the element 6, the element 7 being provided at the inner end of its portion 14 with an upstanding portion 15 having an opening 16 for the passage of a screw or other securing element 17 which is fitted into the body 4, the said portion 15 being received within one or the other of the grooves 5. The portion 14 of the element 7 is provided at its outer end with an aperture or notch 18 corresponding to the apertures or notches 13 heretofore referred to and adapted to receive one of the terminals 2 or 3 of one of the battery cells as illustrated in Figure 1. It will be evident from the foregoing that any desired number of the conductor elements 6 and 7 may be arranged at suitably spaced intervals throughout the length of the body 4 and that all of these elements are relatively spaced and electrically insulated by the said body. However, the terminals of two adjacent cells may be electrically connected by a pair of conductor elements 7 and in the manner illustrated in Figures 1 and 6 of the drawings in which arrangement, although the portions 15 of the two said elements 7 are seated in separate ones of the grooves 5 in the body 4 and are in this respect out of electrical contact. A single screw 19 is employed for securing both of the elements to the body, this screw passing through openings 16 in the portions 15 of both elements 7 and thus establishing electrical connection between the said elements.

Any of the securing screws 12, 17 or 19 may serve also as a securing means for an electrical terminal connection 20 of any ordinary type and to which an associated conductor wire 21 may be soldered or otherwise permanently connected, and usually the screws 17 which secure the elements 7 in place upon the body 4, will have associated with them the connections 20, these single conductor elements being usually located at the terminals of the battery circuit which is provided by the connector embodying the invention. In the embodiment illustrated in Figure 1, two of the conductor wires 21 are employed and all of the cells 1 are embraced in the circuit of which these wires form a part. In such an assemblage however it might frequently be desirable to establish another circuit embracing for example only two or three of the cells and in order that this may be conveniently done, the insulating body 4 is formed at intervals in its opposite sides with openings 22 which register with the openings 11 in the bridge portions 9 of the conductor elements 6, so that, as illustrated in dotted lines in Figure 5 of the drawings, one of the connections 20 might be secured by a screw entering one or the other of the openings 22 and threaded into the opening 11 of the respective element 6, the circuit being in this manner tapped at a point to include one, two, or any desired part of the total number of cells.

The embodiment of the invention illustrated in Figures 2 and 7 of the drawings is substantially identical with that shown in the previously described figures except that in this instance the insulator body 4 is formed with only one of the grooves 5 and is adapted to be secured, as for example by screws 23, to a wall surface or the like and at a suitably elevated point above a shelf or other base 24 upon which the cells to be coupled by the connector may be disposed to rest. In this manner a number of cells may be electrically coupled in proper order and at the same time secured in such a manner as to prevent them being knocked about and becoming relatively displaced, and yet any one or more of the cells may be readily removed and replaced whenever occasion requires.

In the previously described embodiment of the invention the attaching portions of the conductor elements whether of the single or double type have been seated in grooves formed in the insulator body 4 of the connector, but this construction may be modified as shown in Figure 8, in the instance of the single conductor, and as shown in Figures 12, 13 and 14 in the instance of the conductor of the double type. Structurally the conductor elements in these modified embodiments are identical with the corresponding elements in the previously described embodiment but instead of being anchored in grooves in the insulating body 4, they are secured directly upon the opposite side faces of the said body. Thus Figure 8 illustrates a conductor of the single type indicated by the numeral 25 and corresponding to the conductor 7 and having a portion 26 corresponding to the portion 15 of the conductor 7 and disposed against one face of the insulator body 4 and secured in place by a screw or the like 27. Similarly in Figures 12, 13 and 14, the conductor of the double type indicated in general by the numeral 28 and substantially identical with the conductor 6, is secured by screws 29 upon one face of the insulator body 4, the opening 30 in the bridge portion of this conductor element and corresponding to the opening 11 being in registration with a threaded socket 31 formed in the said face of the insulator body 4 so as to receive the screw to secure in place and in electrical contact with the bridge portion of the said element 28, one of the connections 20.

In the previously described forms of the invention the conductor elements are formed from sheet metal but as illustrated in Figures 9, 10 and 11 these elements may be made from wire, as indicated by the numeral 32, and may be provided with terminal ears 33 to receive the binding posts of the battery cells of the single conductor or the bridging portions of conductors of the double type may be embedded in the insulating body, this body being molded from some suitable insulating material. In this form of the invention the inner ends of the conductor elements if of the single type, or the bridging portions of the conductor if of the double type, are flattened, as at 34, and provided in their flattened portions with openings 35 for the passage of the binding screws.

Having thus described the invention, what is claimed as new is:

1. In a battery connector, an insulating body to extend across a plurality of battery cells, conductor elements extending laterally from said body and having their inner ends embedded therein and their outer ends constructed to engage battery-cell binding posts, bridging members of conducting material embedded in the insulating body and connecting the inner ends of some conductor elements, and means extending through the insulating body to secure the bridging members and the inner ends of conductor elements within said body, said means serving also to connect circuit conductors to said elements.

2. A battery connector comprising an insulating bar having a longitudinal groove in its under side, conductor elements constructed at their outer ends to engage the terminals of battery cells and having their inner ends upturned and fitting in the groove in the insulating bar, other U-shaped conductor elements having the outer ends of their side portions constructed to engage terminals of battery cells and their bridge portions upturned and fitting in the groove in the insulating bar, and means for connecting some of the elements to circuit conductors at the insulating bar.

In testimony whereof I affix my signature.

CLARENCE E. POTTER.